United States Patent [19]

Honda et al.

[11] 4,371,411
[45] Feb. 1, 1983

[54] METHOD OF ADHERING UNVULCANIZED RUBBER TO VULCANIZED RUBBER THROUGH VULCANIZATION

[75] Inventors: Toshio Honda, Akigawa; Yukio Fukuura, Kodaira; Hikaru Ishikawa, Kokubunji; Shozo Kojima, Higashimurayama; Itsuo Tanuma, Tokorozawa; Masao Ogawa, Kawagoe, all of Japan

[73] Assignee: Bridgestone Tire Company Limited, Tokyo, Japan

[21] Appl. No.: 188,784

[22] Filed: Sep. 19, 1980

Related U.S. Application Data

[63] Continuation of Ser. No. 43,961, May 30, 1979, abandoned.

[30] Foreign Application Priority Data

May 30, 1978 [JP] Japan .................................. 53-63769

[51] Int. Cl.³ .............................................. B32B 31/00
[52] U.S. Cl. .................................. 156/281; 152/330 R; 152/374; 156/95; 156/96; 156/110 R; 156/110 A; 156/110 C; 264/36; 264/135; 264/347; 427/140

[58] Field of Search ............................ 427/393.5, 140; 152/330 R, 374; 260/4 AR, 5, 727; 156/95, 96, 110 R, 110 A, 110 C, 281; 428/493, 495, 519, 520, 521, 515; 264/36, 135, 236, 259, 347, 265; 525/237

[56] References Cited

U.S. PATENT DOCUMENTS

| | | | |
|---|---|---|---|
| 2,405,802 | 8/1946 | Taber | 264/326 X |
| 3,198,680 | 8/1965 | Iknayan | 156/96 |
| 3,513,047 | 5/1970 | Campbell et al. | 156/96 |
| 3,938,574 | 2/1976 | Burmester et al. | 152/330 R |
| 4,051,090 | 9/1977 | Horowitz et al. | 156/96 X |
| 4,119,588 | 10/1978 | Carpino | 525/235 X |
| 4,193,437 | 3/1980 | Powell | 260/5 X |

Primary Examiner—Thurman K. Page
Attorney, Agent, or Firm—Sughrue, Mion, Zinn, Macpeak & Seas

[57] ABSTRACT

An unvulcanized rubber composition, whose rubber component consists of polybutadiene rubber as an essential component and at least one of styrene-butadiene rubber and a rubber of natural rubber and/or polyisoprene rubber, has a high adhesion to a vulcanized rubber composition, whose rubber component consists mainly of at least one rubber selected from natural rubber, polyisoprene rubber, polybutadiene rubber and styrene-butadiene rubber, and can be easily adhered to the vulcanized rubber composition through vulcanization without carrying out particular surface treatment of the vulcanized rubber composition.

10 Claims, 1 Drawing Figure

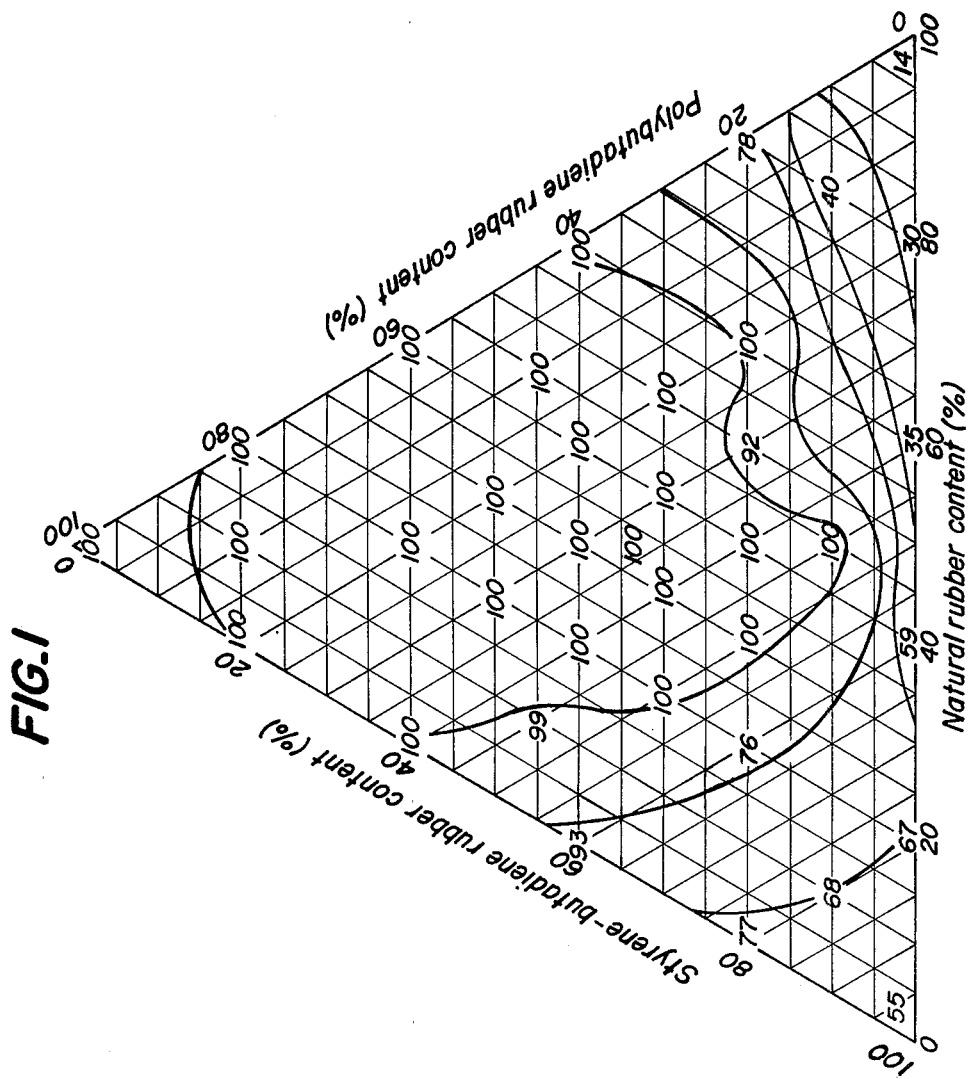

METHOD OF ADHERING UNVULCANIZED RUBBER TO VULCANIZED RUBBER THROUGH VULCANIZATION

This is a continuation of application Ser. No. 43,961 filed May 30, 1979 now abandoned.

BACKGROUND OF THE INVENTION (1) Field of the Invention

The present invention relates to a method of adhering unvulcanized rubber to vulcanized rubber through vulcanization.

(2) Description of the Prior Art

It is a commonly used means in rubber industry that an unvulcanized rubber is disposed on the surface of a vulcanized rubber and both the rubbers are adhered to each other through vulcanization, for example, in the retreading and partial repairing of tire, the endless adhesion and partial repairing of conveyer belt and rubber roller, the formation of fin on the belt surface, the production of weather strip and the like. In order to improve the adhesion of vulcanized rubber to unvulcanized rubber through vulcanization, there have hitherto been carried out the following treatments, for example, (1) the surface of a vulcanized rubber is buffer or shaved by a knife and the like to refresh the surface, and (2) the surface of a vulcanized rubber is treated with an organic acid or inorganic acid. However, in these treatments, the operation is troublesome, and the strength in the adhering portion is not always uniform. Further, sometimes the effect of these treatments does not sufficiently appear due to the variation of the properties of the vulcanized rubber itself with the lapse of time.

SUMMARY OF THE INVENTION

The present invention aims to obviate the above described drawbacks in the conventional method of adhering unvulcanized rubber to vulcanized rubber through vulcanization, and provides a novel method of adhering firmly unvulcanized rubber to vulcanized rubber through vulcanization in a very simple manner.

That is, the feature of the present invention is the provision of a method of adhering an unvulcanized rubber composition to a vulcanized rubber composition through vulcanization, comprising disposing an unvulcanized rubber composition, whose rubber component consists of polybutadiene rubber as an essential component and at least one of styrene-butadiene rubber and a rubber of natural rubber and/or polyisoprene rubber, on the surface of a vulcanized rubber composition containing at least 80% by weight, based on the amount of its rubber component, of at least one rubber selected from natural rubber, polyisoprene rubber, polybutadiene rubber and styrene-butadiene rubber, and then vulcanizing the unvulcanized rubber composition.

According to the present invention, the composition of a vulcanized rubber and that of an unvulcanized rubber are specifically limited, whereby the unvulcanized rubber can be adhered to the vulcanized rubber with a high adhesion through vulcanization without substantially carrying out a surface treatment, such as buffing, of the vulcanized rubber. Therefore, the operation can be simplified and the reliability of adhesion is high. Moreover, due to the absence of buffing treatment, the dimensional accuracy of the aimed product is improved and aimed products exactly having a designed dimension can be obtained.

BRIEF DESCRIPTION OF THE FIGURE

FIG. 1 is a triangular coordinate showing a relation between the composition of the rubber component of the unvulcanized rubber composition and the adhesion of the rubber composition.

DETAILED DESCRIPTION OF THE INVENTION

The rubber component of the vulcanized rubber composition to be used in the present invention includes natural rubber, polyisoprene rubber, polybutadiene rubber and styrene-butadiene rubber. These rubbers can be used alone or in the form of a blend of at least two rubbers. Further, a rubber blend of these rubbers with other rubbers, such as ethylene-propylene rubber, acrylonitrile-butadiene rubber and the like, can be used as the rubber component in the present invention. In this case, the blended amount of these other rubbers must not exceed 20% by weight based on the amount of the rubber blend. Because, a vulcanized rubber composition, whose rubber component is a rubber blend containing more than 20% by weight of these other rubbers, is poor in the adhesion and is not suitable for practical use. But, when the rubber component is a rubber blend containing not more than 20% by weight of these other rubbers, these other rubbers do not substantially affect adversely the adhesion of the vulcanized rubber composition.

Moreover, the above described vulcanized rubber composition can contain any of compounding ingredients contained in the commonly used vulcanized rubber, such as vulcanizing agent, vulcanization accelerator, antioxidant, softener, carbon black, inorganic fillers, such as silica, calcium carbonate and the like, resin, wax and the like.

As the above described vulcanized rubber composition, there can be used vulcanized rubber compositions produced by any vulcanization processes, such as sulfur vulcanization, peroxide crosslinking, quinoid crosslinking and the like. However, a vulcanized rubber composition obtained by sulfur vulcanization is most generally used in the present invention. In the present invention, since a vulcanized rubber composition obtained under a commonly used vulcanization condition and having a usual vulcanization degree can exhibit a sufficiently high adhesion, it is not necessary to prepare a vulcanized rubber composition having a short vulcanization degree.

The vulcanized rubber composition maintains its original adhesion within about one year when the rubber composition is left to stand at room temperature in a room from just after the vulcanization. Therefore, a particular storage means is not necessary. However, when it is intended to allow the vulcanized rubber composition to stand for a long period of time, it is preferable to store the rubber composition in a dark cold place in order to prevent the variation of the surface of the vulcanized rubber composition as small as possible.

The rubber component of the unvulcanized rubber composition to be adhered to the above described vulcanized rubber composition through vulcanization is a rubber blend consisting of polybutadiene as an essential component and at least one of styrene-butadiene rubber and a rubber of natural rubber and/or polyisoprene rubber.

The polybutadiene rubber to be used in the present invention includes 1,4-polybutadiene rubber and polybutadiene rubber having a mixed configuration of cis-1,4-, trans-1,4- and 1,2-structures. The styrene content in the styrene-butadiene rubber is preferably 15-70% by weight and is most preferably about 25% by weight. Further, polyisoprene rubber having a similar structure to that of natural rubber is preferably used, and it is desirable that the polyisoprene rubber contains at least 90% of cis-1,4-structure.

In the present invention, it is preferable that the rubber component of the unvulcanized rubber composition contains at least 20% by weight of polybutadiene rubber in order that the unvulcanized rubber composition has an excellent adhesion to the above described vulcanized rubber composition. In the present invention, it is necessary that the rubber component of the unvulcanized rubber composition contains at least one of styrene-butadiene rubber and a rubber of natural rubber and/or polyisoprene rubber in addition to polybutadiene rubber. In this case, in order to obtain an unvulcanized rubber composition having a high adhesion to the vulcanized rubber composition, it is preferable that the amount of natural rubber and/or polyisoprene rubber contained in the rubber component is not more than 70% by weight based on the amount of the rubber component, and that of styrene-butadiene rubber contained in the rubber component is not more than 60% by weight based on the amount of the rubber component. The optimum composition of the rubber component of the unvulcanized rubber composition is determined depending upon the kind of the rubber component of the vulcanized rubber composition. However, an unvulcanized rubber composition, whose rubber component consists of 30-70% by weight of polybutadiene rubber, 10-50% by weight of natural rubber and/or polyisoprene rubber and 10-40% by weight of styrene-butadiene rubber, has a satisfactorily high adhesion to any of the vulcanized rubber compositions defined in the present invention.

The above described unvulcanized rubber composition may contain commonly used amounts of vulcanizing agent, vulcanization accelerator, softener, antioxidant, resin, wax, carbon black and inorganic fillers, such as silica, calcium carbonate and the like. For the vulcanization of the unvulcanized rubber composition, sulfur vulcanization, peroxide crosslinking and quinoid crosslinking are effectively used. Among them, the sulfur vulcanization is effective independently of the vulcanization process for the above described vulcanized rubber composition. When the unvulcanized rubber composition is vulcanized by a process other than the sulfur vulcanization, it is preferable that the vulcanization process is the same as that for the vulcanized rubber composition.

When the unvulcanized rubber composition is vulcanized by the sulfur vulcanization, the amount of sulfur is 1.5-3 parts by weight, preferably 1.75-2.25 parts by weight, based on 100 parts by weight of the rubber component of the unvulcanized rubber composition. As the vulcanization accelerator, thiazole series accelerators are preferably used. Among them, there are particularly preferably used delayed action accelerators, such as cyclohexylbenzothiazolesulfeneamide, N-oxydiethylene-2-benzothiazolesulfeneamide, N,N-diisopropyl-2-benzothiazolesulfeneamide, N,N-diethyldithiocarbamoyl-2-mercaptobenzothiazolesulfeneamide, 2-(2,4-dinitrophenyl)mercaptobenzothiazole and the like. The vulcanization accelerator is used in an amount of 0.5-1.5 parts by weight, preferably 0.8-1.2 parts by weight, based on 100 parts by weight of the rubber component of the unvulcanized rubber composition.

When peroxide or quinoid crosslinking is carried out, the amount of vulcanizing agent is 0.1-10 parts by weight based on 100 parts by weight of the rubber component of the unvulcanized rubber composition.

An explanation will be made hereinafter with respect to a method of adhering the vulcanized rubber composition to the unvulcanized rubber composition. Stains on the surface of a vulcanized rubber article are wiped off by a proper solvent and the like, an unvulcanized rubber composition is disposed on the surface of the vulcanized rubber article, the resulting rubber assembly is placed in a mold having a predetermined dimension, and the unvulcanized rubber composition is vulcanized under a proper vulcanization condition. The vulcanization condition should be varied depending upon the compounding recipe of the unvulcanized rubber composition, but the vulcanization is usually carried out at a temperature of 140°-170° C. for 10-16 minutes.

As described above, according to the present invention, the surface treatments, such as buffing and the like, of a vulcanized rubber composition is not substantially necessary contrary to the conventional method, and an unvulcanized rubber composition can be easily adhered to a vulcanized rubber composition by merely wiping off stains on the surface of the vulcanized rubber composition, and disposing the unvulcanized rubber composition on the above treated surface of the vulcanized rubber composition and vulcanizing the unvulcanized rubber composition. Therefore, the unvulcanized rubber composition can be firmly adhered to the vulcanized rubber composition through vulcanization with a high dimensional accuracy by a very simple operation.

The following examples are given for the purpose of illustration of this invention and are not intended as limitations thereof.

EXAMPLE 1

A vulcanized rubber sheet was produced in the following compounding recipe by the use of styrene-butadiene rubber (SBR #1500) as a rubber component.

| Ingredient | Compounding recipe (parts by weight) |
| --- | --- |
| Rubber, SBR #1500 | 100 |
| Carbon black, ISAF | 50 |
| Process oil | 5 |
| Stearic acid | 2 |
| Antioxidant, 810 NA* | 1 |
| Wax | 1.5 |
| Tackifier | 2 |
| Zinc oxide | 5 |
| Sulfur | 2 |
| Accelerator, NOBS** | 1 |
| Accelerator, Diphenylguanidine | 0.8 |

*N—phenyl-N—isopropyl-p-phenylenediamine
**N—oxydiethylenebenzothiazolesulfeneamide.

In the production of the above described vulcanized rubber sheet, a homogeneous mixture obtained by compounding the above described ingredients was formed into a sheet having a thickness of 2 mm, and the sheet was lined with a lining canvas and then vulcanized at 160° C. for 20 minutes under a pressure of 50 kg/cm² to obtain the vulcanized rubber sheet. The vulcanized rubber sheet was left to stand for 7 days.

Unvulcanized rubber sheets to be adhered to the above obtained vulcanized rubber sheet were produced in the following manner. As the rubber components, there were used two or three component rubber blends having various compositions, which were produced by combining two or three of natural rubber, polybutadiene rubber (BR 01, made by Japan Synthetic Rubber Co.) and styrene-butadiene rubber (SBR #1500), were used, and the following ingredients were kneaded according to the following compounding recipe. The resulting homogeneous mixture was formed into a sheet having a thickness of 3 mm and the sheet was lined with a lining canvas.

| Ingredients | Compounding recipe (parts by weight) |
| --- | --- |
| Rubber component | 100 |
| Carbon black, ISAF | 50 |
| Process oil | 5 |
| Stearic acid | 2 |
| Antioxidant, 810 NA | 1 |
| Wax | 1.5 |
| Tackifier | 2 |
| Zinc oxide | 5 |
| Sulfur | 2 |
| Accelerator, NOBS | 1 |

The surface of the above described vulcanized rubber sheet was washed with n-hexane, and each of the above obtained unvulcanized rubber sheets was disposed on the above treated surface of the vulcanized rubber sheet. Then, the resulting rubber assembly was placed in a mold having a depth of 5 mm, and the unvulcanized rubber sheet was vulcanized at 160° C. for 20 minutes under a pressure of 50 kg/cm$^2$ to produce an adhered rubber sheet. A test sample having a width of 2.5 cm and a length of 15 cm was punched out from the adhered rubber sheet by means of an oblong cutter (1"×6"), and subjected to a T-shape peeling test at a rate of 50 mm/min by means of a tensile tester. The obtained results are shown in the triangular coordinate shown in FIG. 1. The numeral in the triangular coordinate indicates the peeling strength (kg/25 mm).

EXAMPLE 2

Adhered rubber sheets were produced in the same manner as described in Example 1, except that natural rubber was used as a rubber component of the vulcanized rubber sheet in place of the styrene-butadiene rubber, and rubber blends shown in the following Table 1 were used as rubber components of unvulcanized rubber sheets. The results of the peeling test of the resulting adhered rubber sheets are shown in Table 1.

TABLE 1

| Experiment No. | 2a | 2b | 2c | 2d | 2e | 2f |
| --- | --- | --- | --- | --- | --- | --- |
| Rubber component of the unvulcanized rubber (wt. %) | | | | | | |
| Natural rubber | 20 | 10 | 20 | 50 | 20 | 45 |
| BR 01 | 60 | 80 | 40 | 30 | 20 | 10 |
| SBR #1500 | 20 | 10 | 40 | 20 | 60 | 45 |
| Peeling strength (kg/25 mm) | 100 | 100 | 94 | 54 | 78 | 32 |

EXAMPLE 3

Wax, antioxidant, stearic acid and the like are bled out on the surface of vulcanized rubber sheet with the lapse of time. In this Example 3, the influence of these bled substances on the adhesion of vulcanized rubber sheet was examined. Each of the vulcanized rubber sheets produced in Examples 1 and 2 was placed between polyethylene sheets and left to stand for 1 day, 7 days, 30 days and 90 days at room temperature. Each of the above treated sheets, after washing the surface with n-hexane or without washing the surface, was adhered to an unvulcanized rubber sheet produced in the same compounding recipe as described in Example 1, except that a rubber blend of natural rubber, BR 0.1 and SBR #1500 in a weight ratio of natural rubber/BR 01/SBR #1500=33.3/33.3/33.3 was used as a rubber component, and a peeling test of the adhered rubber sheet was carried out in the same manners as described in Example 1. The obtained results are shown in the following Table 2.

TABLE 2

| | | Peeling strength (kg/25 mm) | | | | |
| --- | --- | --- | --- | --- | --- | --- |
| Kind of vulcanized rubber | n-Hexane washing | after lapse of 0 day | after lapse of 1 day | after lapse of 7 days | after lapse of 30 days | after lapse of 90 days |
| Natural rubber | do | 90 | 81 | 90 | 67 | 86 |
| | none | 89 | 88 | 83 | 88 | 70 |
| SBR #1500 | do | 95 | 95 | 94 | 90 | 98 |
| | none | 95 | 95 | 95 | 95 | 100 |

It can be seen from Table 2 that, according to the present invention, even when a vulcanized rubber sheet is left to stand for 90 days, the rubber sheet still has excellent adhesion, and further even when some of the compounded ingredients have bled on the vulcanized rubber surface, the rubber surface has excellent adhesion regardless of the presence of bled ingredients.

EXAMPLE 4

In this Example 4, the influence of the kind of vulcanization accelerators added to unvulcanized rubber sheet upon the adhesion of the sheet was examined. The vulcanized rubber sheet used in this Example 4 is the same as that used in Example 2. The compounding recipe of unvulcanized rubber sheets and the results of peeling test of the resulting adhered rubber sheets are shown in the following Table 3.

TABLE 3

| Experiment No. | 4a | 4b | 4c | 4d | 4e | 4f | 4g |
| --- | --- | --- | --- | --- | --- | --- | --- |
| Compounding recipe (parts by weight) | | | | | | | |
| Natural rubber | 33.3 | 33.3 | 33.3 | 33.3 | 33.3 | 33.3 | 33.3 |
| SBR #1500 | 33.3 | 33.3 | 33.3 | 33.3 | 33.3 | 33.3 | 33.3 |
| BR 01 | 33.3 | 33.3 | 33.3 | 33.3 | 33.3 | 33.3 | 33.3 |
| Carbon black, ISAF | 50 | 50 | 50 | 50 | 50 | 50 | 50 |
| Process oil | 5 | 5 | 5 | 5 | 5 | 5 | 5 |
| Wax | 1.5 | 1.5 | 1.5 | 1.5 | 1.5 | 1.5 | 1.5 |
| Antioxidant, 810 NA | 1.5 | 1.5 | 1.5 | 1.5 | 1.5 | 1.5 | 1.5 |
| Stearic acid | 2 | 2 | 2 | 2 | 2 | 2 | 2 |
| Tackifier | 2 | 2 | 2 | 2 | 2 | 2 | 2 |
| Zinc oxide | 5 | 5 | 5 | 5 | 5 | 5 | 5 |
| Sulfur | 2 | 2 | 2 | 2 | 2 | 2 | 2 |
| Accelerator, NOBS | 0.25 | 0.5 | 1.0 | | | | |
| Accelerator, CZ* | | | | 0.5 | | | |
| Accelerator, DM** | | | | | 0.5 | | |
| Accelerator, DPG*** | | | | | | 0.5 | |
| Accelerator, TS**** | | | | | | | 0.5 |
| Peeling strength | 49 | 90 | 90 | 89 | 43 | 48 | 28 |

TABLE 3-continued

| Experiment No. | 4a | 4b | 4c | 4d | 4e | 4f | 4g |
|---|---|---|---|---|---|---|---|
| (kg/25 mm) | | | | | | | |

*CZ: N—cyclohexylbenzothiazolesulfeneamide
**DM: Dibenzothiazyl disulfide
***DPG: Diphenylguanidine
****TS: Tetramethylthiuram monosulfide.

As the vulcanization accelerator, delayed action accelerators, such as NOBS and CZ, are effective for giving an excellent adhesion to unvulcanized rubber sheet. The compounding amount of the accelerators is preferably 0.5–1.0 part by weight based on 100 parts by weight of the rubber component of the unvulcanized rubber sheet.

What is claimed is:

1. A method of adhering an unvulcanized rubber sheet to a vulcanized rubber article through vulcanization, comprising disposing an unvulcanized rubber sheet, whose rubber component consists essentially of 30–70% by weight polybutadiene rubber, 10–40% by weight of styrene-butadiene rubber and 10–50% by weight of at least one of natural rubber and polyisoprene rubber, on the surface of a vulcanized rubber article containing at least 80% by weight, based on the amount of its rubber component, of at least one rubber selected from natural rubber, polybutadiene rubber and styrene-butadiene rubber, and then vulcanizing the unvulcanized rubber sheet, wherein treatment of said vulcanized rubber article prior to said vulcanizing consists of wiping off stains on the surface of said vulcanized article.

2. A method according to claim 1, wherein at least 80% by weight of said vulcanized rubber article is said natural rubber.

3. A method according to claim 1, wherein at least 80% by weight of said vulcanized rubber article is said polybutadiene rubber.

4. A method according to claim 1, wherein at least 80% by weight of said vulcanized rubber article is said styrene-butadiene rubber.

5. A method according to claim 1, wherein said polybutadiene rubber in said unvulcanized rubber article is selected from the group consisting of 1,4-polybutadiene rubber and polybutadiene rubber having a mixed configuration of cis-1,4-, trans-1,4- and 1,2-structures.

6. A method according to claim 1, wherein said styrene-butadiene rubber of said unvulcanized rubber article comprises 15–70% by weight styrene.

7. A method according to claim 1, wherein said polyisoprene rubber of said unvulcanized rubber article contains at least 90% cis-1,4-structure.

8. A method according to claim 1, wherein at least 80% by weight of said vulcanized rubber sheet is said natural rubber.

9. A method according to claim 1, wherein at least 80% by weight of said vulcanized rubber sheet is said polybutadiene rubber.

10. A method according to claim 1, wherein at least 80% by weight of said vulcanized rubber sheet is said styrene-butadiene rubber.

* * * * *